United States Patent
Lee et al.

(10) Patent No.: US 9,325,014 B2
(45) Date of Patent: Apr. 26, 2016

(54) BRANCHED NANOSTRUCTURES FOR BATTERY ELECTRODES

(75) Inventors: Jae Ho Lee, Albany, NY (US); Isaac Lund, Albany, NY (US)

(73) Assignee: THE RESEARCH FOUNDATION OF STATE UNIVERSITY OF NEW YORK, New York, NY (US)

( * ) Notice: Subject to any disclaimer, the term of this patent is extended or adjusted under 35 U.S.C. 154(b) by 295 days.

(21) Appl. No.: 13/817,289

(22) PCT Filed: Aug. 23, 2011

(86) PCT No.: PCT/US2011/048798
§ 371 (c)(1),
(2), (4) Date: Feb. 15, 2013

(87) PCT Pub. No.: WO2012/027360
PCT Pub. Date: Mar. 1, 2012

(65) Prior Publication Data
US 2013/0143124 A1    Jun. 6, 2013

Related U.S. Application Data

(60) Provisional application No. 61/377,729, filed on Aug. 27, 2010.

(51) Int. Cl.
| | |
|---|---|
| *H01M 4/75* | (2006.01) |
| *H01M 4/52* | (2010.01) |
| *H01M 4/70* | (2006.01) |
| *H01M 4/13* | (2010.01) |

(Continued)

(52) U.S. Cl.
CPC .............. *H01M 4/70* (2013.01); *H01M 4/0402* (2013.01); *H01M 4/13* (2013.01); *H01M 4/134* (2013.01); *H01M 4/139* (2013.01); *H01M 4/1395* (2013.01); *H01M 4/366* (2013.01); *H01M 4/66* (2013.01); *H01M 4/662* (2013.01); *H01M 4/667* (2013.01); *H01M 4/78* (2013.01); *H01M 10/052* (2013.01); *H01M 4/661* (2013.01); *H01M 4/663* (2013.01); *H01M 4/664* (2013.01); *Y02E 60/122* (2013.01); *Y02T 10/7011* (2013.01)

(58) Field of Classification Search
CPC ........... H01M 4/38; H01M 4/52; H01M 4/75; H01M 4/134; H01M 4/386; H01M 4/853
See application file for complete search history.

(56) References Cited

U.S. PATENT DOCUMENTS

| 8,197,598 B2 | 6/2012 | Sun et al. |
| 8,198,622 B2 | 6/2012 | Kawashima et al. |

(Continued)

OTHER PUBLICATIONS

International Search Report for PCT/US2011/048798 dated Mar. 9, 2012.

(Continued)

*Primary Examiner* — Ula C Ruddock
*Assistant Examiner* — Thomas Parsons
(74) *Attorney, Agent, or Firm* — Heslin, Rothenberg, Farley & Mesiti, P.C.

(57) ABSTRACT

The invention relates to electrochemical electrodes containing branched nanostructures having increased surface area and flexibility. These branched nanostructures allow for higher anode density, resulting in the creation of smaller, longer-lasting, more efficient batteries which require less area for the same charging capacity. Also disclosed are methods for creating said branched nanostructures and electrodes.

8 Claims, 6 Drawing Sheets

(51) Int. Cl.

| | |
|---|---|
| *H01M 4/134* | (2010.01) |
| *H01M 4/139* | (2010.01) |
| *H01M 4/1395* | (2010.01) |
| *H01M 4/66* | (2006.01) |
| *H01M 4/78* | (2006.01) |
| *H01M 10/052* | (2010.01) |
| *H01M 4/04* | (2006.01) |
| *H01M 4/36* | (2006.01) |

(56) References Cited

U.S. PATENT DOCUMENTS

| | | |
|---|---|---|
| 8,877,374 B2 | 11/2014 | Cui et al. |
| 8,962,137 B2 | 2/2015 | Lee et al. |
| 2004/0005258 A1 | 1/2004 | Fonash et al. |
| 2009/0111022 A1 | 4/2009 | Dahn et al. |
| 2009/0186276 A1 | 7/2009 | Zhamu et al. |
| 2010/0112373 A1 | 5/2010 | Coffey et al. |
| 2010/0141211 A1 | 6/2010 | Yazami |

OTHER PUBLICATIONS

Chan CK et al., "High-performance lithium battery anodes using silicon nanowires", Nature Nanotechnology, 2008, 3, 31-35.

Liu et al., "Controlling the growth and field emission properties of silicide nanowire arrays by direct silicification of Ni foil", 2008, Nanotechnology, 19, 375602. pp. 1-4.

Wang D et al., "Rational Growth of Branched and Hyperbranched Nanowire Structures", Nano Letters, 2004, 4(5), 871-874.

Kim C-J et al., "Spontaneous Chemical Vapor Growth of NiSi Nanowires and Their Metallic Properties", Adv. Mater., 2007, 19, 3637-3642.

Zhou S et al., "Si/TiSi2 Heteronanostructures as High-Capacity Anode Material for Li Ion Batteries", Nano Letters, 2010, 10, 860-863.

Bailly A et al., "Direct Quantification of Gold along a Single Si Nanowire", Nano Letters, 2008, 8(11), 3709-3714.

BRANCHED NANOSTRUCTURES FOR BATTERY ELECTRODES

CROSS-REFERENCE TO RELATED APPLICATIONS

This application is a U.S. National Phase filing under 35 U.S.C. §371 of International Application PCT/US2011/048798, filed Aug. 23, 2011, and published as WO 2012/027360 on Mar. 1, 2012. PCT/US2011/048798 claimed benefit of priority from United States Provisional Application 61/377,729, filed Aug. 27, 2010. The entire contents of each of the prior applications are hereby incorporated herein by reference.

FIELD OF THE INVENTION

The invention relates to electrochemical electrodes containing branched nanostructures and a method for creating said electrodes.

BACKGROUND OF THE INVENTION

Many electrochemical cells show great promise for future power storage applications due to their high efficiency, low emissions and relatively long life. These batteries can be used in, for instance, the electric vehicle market, portable electronics and other home and commercial applications. Lithium-ion (Li-ion) batteries are one such example of these electrochemical cells. Generally, a lithium-ion battery contains two electrodes (an anode and a cathode), an electrolyte, and a material that conducts electrons, such as a current collector. Lithium is the charge carrier. A battery stores energy during charging by moving lithium atoms into the anode. Desirable electrodes have a greater capacity for energy per weight (i.e., are more energy dense) because they can store more energy in a smaller weight and/or area footprint. Therefore, more lithium density in the anode is required for a better battery.

Historically, graphite has been used as the anode in Li-ion batteries and has a capacity of approximately 372 mAh/g. However, research has shown that silicon is the theoretically optimal storage material for lithium ions in these batteries, with a capacity of greater than 4000 mAh/g. Commonly, the silicon is contained as a thin film in the anode of the Li-ion battery. Silicon in film form will stress and detach under the insertion of lithium that occurs during charging, as the rigid silicon film expands during charging by approximately 400%. This causes the silicon to degrade over time, resulting in poor energy storage and battery performance.

SUMMARY OF THE INVENTION

Branched, flexible structures, such as nanowires, have been developed to relieve the stress of lithium-ion insertion. These structures serve a two-fold advantage. First, the surface area of the branched nanostructures is increased dramatically over that of thin film or non-branched nanostructures of the same footprint. Second, the flexibility of these nanostructures, as opposed to thin films, allows lithium ions (or some other charge) to be stored without breaking the anode; that is, the flexible nanostructures mitigate the problems with stressing due to their ability to flex. This allows for the required expansion area needed for, for instance, lithium insertion and silicon expansion.

The use of the branched nanostructures of the invention results in smaller, longer-lasting, more efficient batteries. The core is a resistive semiconducting material and the shell is a lower-resistance current collecting material, that is, the current transfer occurs in the shell, not in the core. This nanostructure is then coated with an electroactive or electrically conductive coating that acts as the capacitive material. The uniqueness of the nanostructures is that each branch is connected to a trunk structure and each trunk is well-connected to the substrate electrically and mechanically. The branched nature of the nanostructures of the invention allows for a higher anode density, thus requiring less area for same charging capacity.

The incorporation of catalyst particles into the growing nanostructures changes the electrical and/or chemical characteristics of the outside shell of the nanostructures. As an example, the conductivity of a nickel silicided nanostructure can be adjusted by changing growth parameters to make the silicided region thicker. An additional surface coating may also be utilized to change the nanostructures' properties. As an example, surface coating a nickel silicided nanostructure with $TiO_2$ is useful for fuel cells, in that the $TiO_2$ serves as a good catalyst support.

One embodiment of the invention provides a method of forming a branched metal silicide nanostructure by first forming the trunk of the structure. The trunk is formed by providing a substrate on which to grow the trunk, disposing a non-refractory transition metal or transition metal alloy catalyst on the substrate; liquefying the catalyst; and exposing this liquefied catalyst to silane gas. It is necessary for at least some of the gas to react with at least some of the liquid to form a solid primary structure (trunk). Next, the branches of the structure are formed. In this case, non-refractory transition metal or transition metal alloy catalyst is disposed on the outer surface of the nanostructure trunk, is liquified and is exposed to silane gas. Again, at least some of the gas reacts with at least some of the liquid, such that branches (solid secondary structures) which are attached to the trunk (solid primary structure) are formed.

One embodiment of the invention provides a method of forming a branched nickel silicide nanostructure by first forming the trunk of the structure. The trunk is formed by providing a substrate on which to grow the trunk, disposing nickel on the substrate; liquefying the nickel; and exposing this liquid to a silane gas. It is necessary for at least some of the gas to react with at least some of the liquid to form a solid primary structure (trunk). Next, the branches of the structure are formed. In this case, nickel is disposed on the outer surface of the nanostructure trunk, is liquified and is exposed to silane gas. Again, at least some of the gas reacts with at least some of the liquid, such that branches (solid secondary structures) which are attached to the trunk (solid primary structure) are formed.

One embodiment of the invention provides a method of forming a branched non-refractory transition metal or transition metal alloy silicide nanostructure. The trunk of the nanostructure is formed by providing a stainless steel foil substrate, disposing a thin film layer of non-refractory transition metal or transition metal alloy on the substrate, liquefying the non-refractory transition metal or transition metal alloy, and exposing the non-refractory transition metal or transition metal alloy to silane gas. At least some of the gas reacts with at least some of the non-refractory transition metal or transition metal alloy to form a solid primary structure (trunk). The liquefaction of the non-refractory transition metal or transition metal alloy allows for discrete islands of non-refractory transition metal or transition metal alloy to be formed. The branches of the nanostructure are then grown on the trunk by disposing non-refractory transition metal or transition metal alloy as a thin film layer on the outer surface of the trunk (solid primary structure), liquefying the non-refractory transition metal or transition metal alloy thin film layer, and exposing the non-refractory transition metal or transition metal alloy to silane gas. As above, at least some of the gas reacts with at least some of the non-refractory transition metal or transition metal alloy to form solid secondary structures (branches) which are attached to the trunk. Additional branches may be grown on the trunk and/or the branches (solid secondary structures) by repeating the process for growing branches (above). Once the desired amount of branching is complete, at least a portion of the outer surfaces of the trunk and/or branches is coated with an electroactive or electrically conductive coating.

One embodiment of the invention provides a method of forming a branched nickel silicide nanostructure. The trunk of the nanostructure is formed by providing a stainless steel foil substrate, disposing a thin film layer of nickel on the substrate, liquefying the nickel, and exposing the nickel to silane gas. At least some of the gas reacts with at least some of the nickel to form a solid primary structure (trunk). The liquefaction of the nickel allows for discrete islands of nickel to be formed. The branches of the nanostructure are then grown on the trunk by disposing nickel as a thin film layer on the outer surface of the trunk (solid primary structure), liquefying the nickel thin film layer, and exposing the nickel to silane gas. As above, at least some of the gas reacts with at least some of the nickel to form solid secondary structures (branches) which are attached to the trunk. Additional branches may be grown on the trunk and/or the branches (solid secondary structures) by repeating the process for growing branches (above). Once the desired amount of branching is complete, at least a portion of the outer surfaces of the trunk and/or branches is coated with an electroactive or electrically conductive coating.

One embodiment of the invention is a method for use in forming a lithium-ion battery by forming branched non-refractory transition metal or transition metal alloy silicide nanostructures according to the methods outlined above and coating at least a portion of the outside surfaces of the nanostructures (trunk and branches) with an electroactive or electrically conductive coating. These coated branched nanostructures are then integrated into a lithium-ion battery.

One embodiment of the invention is a method for use in forming a lithium-ion battery by forming branched nickel silicide nanostructures according to the methods outlined above and coating at least a portion of the outside surfaces of the nanostructures (trunk and branches) with an electroactive or electrically conductive coating. These coated branched nanostructures are then integrated into a lithium-ion battery.

Another embodiment of the invention is a lithium-ion battery electrode. This electrode contains a substrate; a plurality of branched non-refractory transition metal silicide nanostructures grown on the substrate; and an electroactive or electrically conductive coating on at least a portion of the outside of the branched nanostructures.

Another embodiment of the invention is a lithium-ion battery electrode. This electrode contains a substrate; a plurality of branched nickel silicide nanostructures grown on the substrate; and an electroactive or electrically conductive coating on at least a portion of the outside of the branched nano structures.

According to an embodiment of the invention, a component for a lithium-ion battery is provided. The component comprises a substrate upon which a plurality of branched nickel silicide nanostructures is grown and an electroactive or electrically conductive coating on at least a portion of the outside of the branched nanostructures.

According to an embodiment of the invention, a component for a lithium-ion battery is provided. The component comprises a substrate upon which a plurality of branched non-refractory transition metal silicide nanostructures is grown and an electroactive or electrically conductive coating on at least a portion of the outside of the branched nanostructures.

DETAILED DESCRIPTION OF THE INVENTION

Figure 1:
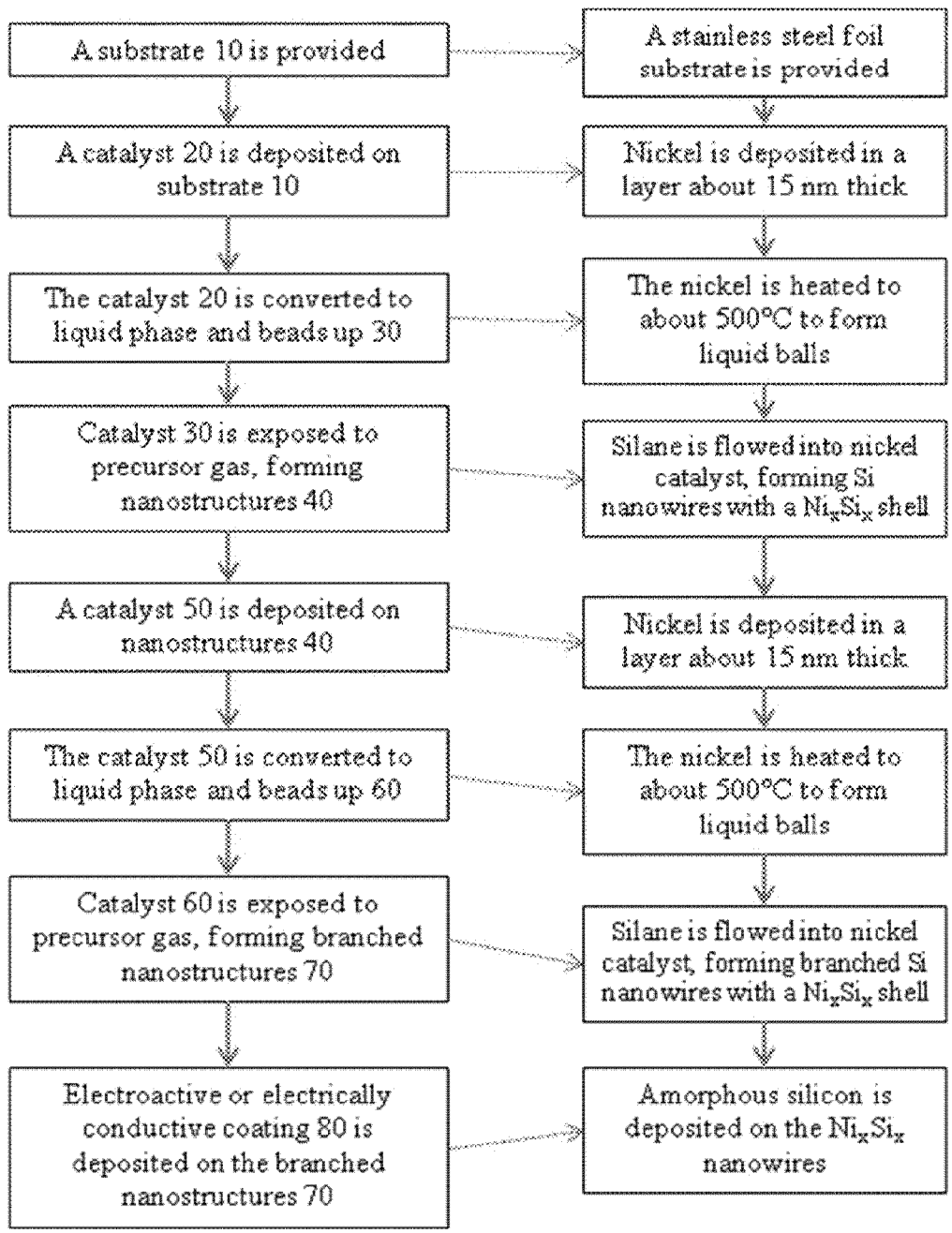
FIG. 1 shows a method of making branched nanostructures by an embodiment of the invention. A general embodiment is on the left, and a corresponding specific example is shown on the right.
Figure 2:
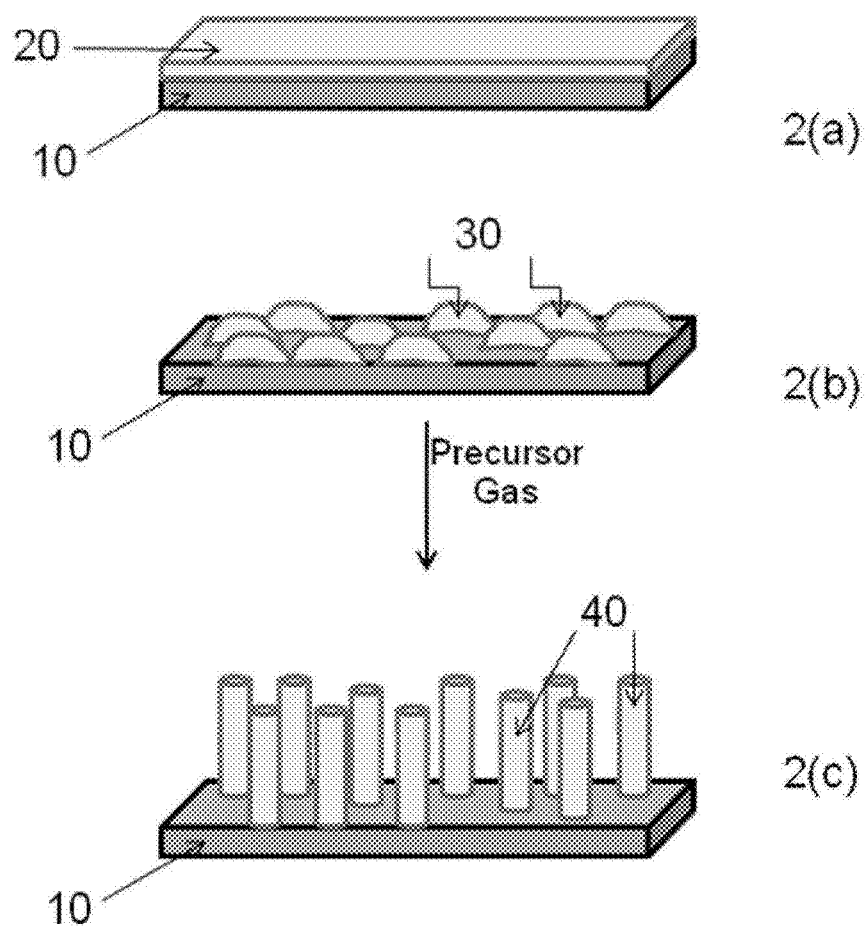
FIG. 2 is an illustration of the initial steps of the method in accordance with the present invention. The method of making the trunks of the branched nanostructures is shown.
Figure 3:
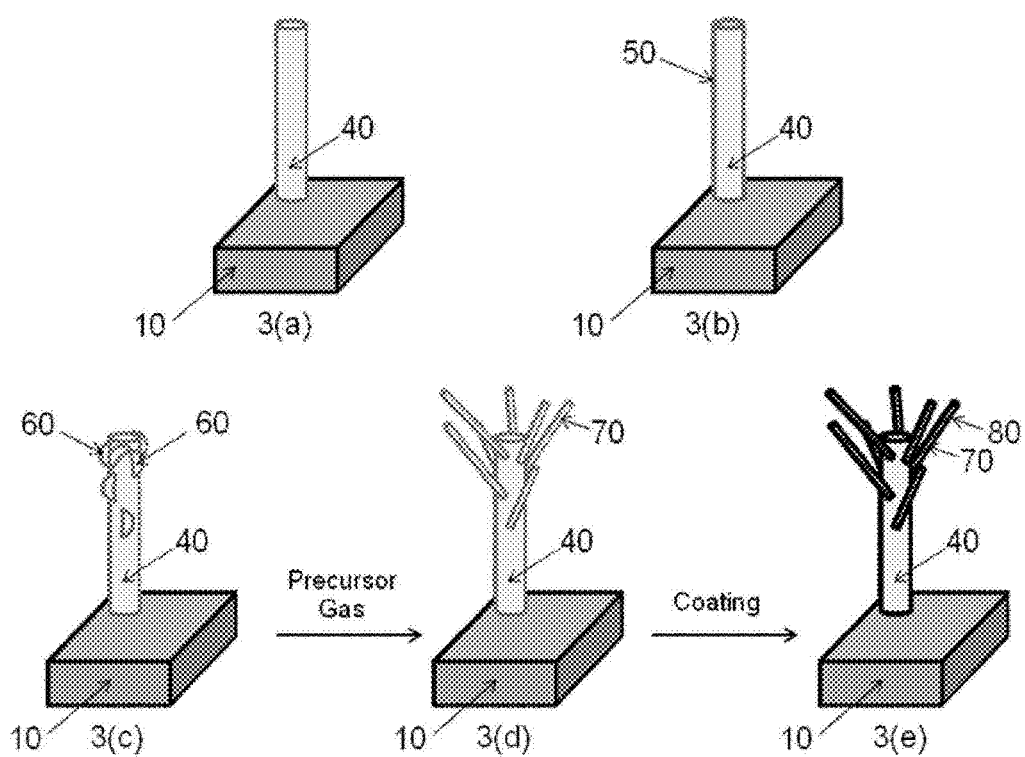
FIG. 3 is an illustration of the formation of the branches on one nanostructure trunk, in accordance with the present invention.

FIGS. 1-3 illustrate an embodiment of the invention, which provides a method of forming branched nanostructures, including providing a substrate 10; depositing a catalyst 20 on the substrate 10; converting the catalyst 20 to liquid phase so that "droplets" or "beads" 30 are formed; exposing said liquid catalyst 30 to a precursor gas so that at least some of the gas reacts with at least some of the liquid catalyst 30 to form nanostructure trunks 40. The process is essentially repeated on the trunks 40, and the trunks 40 act as the substrate for the subsequent growth of branches: a catalyst 50 is deposited on the nanostructure trunks 40; the catalyst 50 is converted to liquid phase to form "droplets" or "beads" 60; the liquid catalyst 60 is exposed to precursor gas so that at least some of the gas reacts with at least some of the liquid catalyst 60 to form branches 70 attached to the trunks 40. The process of forming branches may optionally be repeated by the same mechanism, with each branch 70 acting as the substrate for the subsequent branch growth.

FIG. 1 shows a flow chart of the method of forming branched nanostructures by an embodiment of the invention. The left-hand flow chart demonstrates a general process, while the right-hand flow chart shows a specific example utilizing nickel silicide ($Ni_xSi_x$) nanostructures. Dotted arrows link the step in the general process with the step in the nickel silicide process, merely for clarity. First, the trunk of the nanostructure is formed. The initial step involves providing a surface upon which a catalyst can be deposited. In the nickel silicide method, the substrate is stainless steel foil. A catalyst is then deposited on the substrate. Nickel is used as the catalyst in the $Ni_xSi_x$ example. Next, the catalyst is converted to the liquid phase, such that it beads up to form substantially distinct structures (such as droplets or islands). In the $Ni_xSi_x$ example, the nickel is liquefied by heating to approximately 500° C. This creation of discrete catalyst droplets allows for distinct nanostructures of controlled diameter to be formed.

Once the catalyst is liquefied, a precursor gas is added to the liquid catalyst. It is necessary for at least some of the gas to come into contact with at least some of the liquid catalyst to form nanostructures. One example, illustrated in the flow chart, involves the addition of silane gas into the nickel catalyst. Without being held to one theory, it is believed that silicon in silane preferentially decomposes into the liquid catalyst droplets. When solid solubility is reached, the silicon starts growing underneath the catalyst droplets and, since the catalyst droplets are soluble in the silicon, the nickel is consumed into the outside shell of the nanostructure in a $Ni_xSi_x$ phase. This allows silicon nanostructures to be formed, with a nickel silicide shell along at least a portion of the outer surface of the now-formed nanostructure trunk. This nickel silicide nanostructure is a better current collector than crystalline or amorphous silicon.

It is important to note that the order of the steps of liquefying the catalyst and exposing the catalyst to gas is interchangeable. That is, the catalyst may be liquefied (e.g., through heating), then exposed to the gas or, alternatively, the catalyst may be exposed to the gas, then liquefied.

In order to form the branches of the nanostructures, the steps outlined above are repeated, although the now-formed nanostructure trunk acts as the substrate for the formation of the branches. It is important to note that, because the catalyst is consumed during the formation of the nanostructures (i.e, to form the "shell") more catalyst must be added to the trunk of the nanostructure. The trunk and the branches are not required to be made from the same catalyst material nor growth material. In the $Ni_xSi_x$ example, the catalyst in this step is again nickel. As above, this catalyst is liquefied until it beads up. In the $Ni_xSi_x$ example, the nickel is liquefied by heating to approximately 500° C. Once the catalyst is liquefied, a precursor gas is added to the liquid catalyst. It is necessary for at least some of the gas to come into contact with at least some of the liquid catalyst to form nanostructures. One example, illustrated in the flow chart, involves the addition of silane gas into the nickel catalyst. This allows silicon nanostructure branches to be formed, with a nickel silicide shell forming along at least a portion of the outer surface of the branches.

While not shown in FIG. 1, this process of forming branches can be repeated as many times as desired, with the already-formed nanostructure trunk or branches acting as the substrate for all subsequent branch formations.

The final step in this process is to deposit an electroactive or electrically conductive coating on at least a portion of the outer surfaces of the nanostructure trunks and branches. The addition of this coating as the lithium storage mechanism in a battery provides distinct advantages over uncoated, crystalline silicon. The combination of the electroactive or electrically conductive coating and the nickel silicide shell prevents the crystalline silicon of the core from degrading during charging, unlike in the prior art (for instance, US patent application 2009/0042102). The nickel-silicide shell provides a rigid backbone to maintain the structural integrity of the nanostructure; therefore, even if crystalline silicon is used as the outer electroactive or electrically conductive coating, any degradation of the silicon coating will not affect the structural stability of the nanostructures (i.e., the core nanostructure will not degrade). An ideal coating for use in the invention is a material 1) able to adhere well to the nanostructure trunk and branches; 2) flexible enough to withstand the storage of charge (for instance, lithium storage in a Li-ion battery) without substantial degradation; and 3) able to be introduced under the operating conditions of the system. Exemplary coatings may include silicon, germanium, carbon or nickel. Other exemplary coatings may be transition metal oxides.

One embodiment of the invention utilizes a nickel catalyst, a silane gas, and an electroactive or electrically conductive coating. The nickel-silicide shell formed during the creation of the nanostructure trunk and branches prior to the introduction of the coating helps to preserve the support capabilities of the crystalline silicon.

FIG. 2 illustrates the initial steps of the method for use in forming branched nanostructures. FIG. 2(a) shows a catalyst 20 deposited on a substrate 10. The substrate 10 can be any material upon which additional materials can be deposited. The terms "surface" or "substrate" may be used interchangeably to describe 10 for purposes of this application. In some embodiments of the invention, the substrate is a current collector. In some embodiments of the invention, the substrate is stainless steel foil. Other substrate materials include highly conductive materials such as, but not limited to, copper foil, nickel-coated iron foil and the like.

Any catalyst 20 that has the following properties could be used to form the nanostructures of the invention: 1) at least some of the catalyst must react with the precursor gas to form a "shell" around the crystalline "core", resulting in the consumption of the catalyst during the formation of the nanostructure trunks; 2) the resulting shell, a solid mixture of the precursor gas material and catalyst, must provide an adequate point of attachment for the subsequent electroactive or electrically conductive coating, such that the coating does not delaminate (detach) during charging. In some embodiments of the invention, the catalyst is a non-refractory transition metal. These catalysts may include manganese, iron, cobalt, nickel, copper, palladium, gallium, indium, platinum, tin, lead and bismuth. In some embodiments of the invention, the catalyst 20 is nickel. In some embodiments of the invention, the catalyst 20 is disposed on the substrate 10 at a thickness of between about 5 nm and 250 nm. In other embodiments of the invention, the catalyst 20 is disposed on the substrate 10 at a thickness of between about 5 nm and 50 nm. In other embodiments of the invention, the catalyst 20 is disposed on the substrate 10 at a thickness of between about 10 nm and 25 nm.

The catalyst 20 may be disposed on the substrate 10 in any manner that results in "islands" of catalyst being formed. Various methods may be utilized to deposit the catalyst, including, but not limited to, "GLAD" (glancing angle deposition) or sputter-coat deposition. "Sputter-coat deposition" (or "sputter deposition" or "sputtering") refers to how the atoms are put into the vapor form that are then deposited on the substrate. The catalyst may also be disposed on the substrate in nanoparticle form.

In some embodiments of the invention, the catalyst 20 is deposited on the substrate as a thin film layer. In some embodiments of the invention, the catalyst 20 is deposited on the substrate in a physical vapor deposition e-beam evaporator. Alternatively, the substrate 10 may be dipped into a colloidal catalyst. In these cases, a subsequent step is required to separate the catalyst into discrete islands to allow for subsequent nanostructure growth. For instance, in some embodiments of the invention, a nickel catalyst 20 thin film layer is disposed on the substrate 10. This thin film layer is then subjected to heating, such that the nickel is liquefied and forms beads of liquid catalyst 30, as shown in FIG. 2(b). In some embodiments of the invention, the substrate 10 and catalyst 20 are heated to approximately 500° C. in a horizontal hot walled chemical vapor deposition furnace.

The catalyst is then exposed to a precursor gas. (As is mentioned supra, the gas may be introduced prior to the liquefaction of the catalyst.) In some embodiments of the invention, the gas is silane. The combination of the gas and the liquid catalyst in this system causes the formation of three-dimensional structures: when the catalyst reaches its solubility limit from the addition of the gas, the material of the gas (for instance, silicon) grows underneath the catalyst into a three-dimensional structure. In many cases, this structure is a substantially cylindrical structure whose height exceeds its diameter. This structure ultimately will become a portion of the nanostructure of the invention. Because the catalyst is in liquid form, at least a portion of it will be consumed during the formation of the three-dimensional nanostructure and will create a solid "shell" at and near at least a portion of the outer surface of the three-dimensional nanostructure. This shell is comprised of both catalyst and the material of the precursor gas. The solid "core" of the nanostructure is comprised primarily of the material of the precursor gas. The shell is not necessarily conformal. In some embodiments of the invention, the shell has a thickness of between about 1 nm to 99.5 nm. In other embodiments, the shell has a thickness of between about 1 nm to 50 nm. In other embodiments, the shell has a thickness of between about 1 nm to 25 nm. In other embodiments, the shell has a thickness of between about 1 nm to 10 nm. In other embodiments, the shell has a thickness of between about 5 nm to 99.5 nm. In other embodiments, the shell has a thickness of between about 5 nm to 50 nm. In other embodiments, the shell has a thickness of between about 5 nm to 20 nm. In other embodiments, the shell has a thickness of between about 5 nm to 10 nm. It is important to note that the terms "core" and "shell", as well as the thicknesses listed above, relate to each individual branch or trunk, not necessarily the entire nanostructure.

FIG. 2(c) illustrates this nanostructure growth. In this figure, the trunks 40 of the nanostructure are shown. The core of the trunk is crystalline (for instance, silicon), while the outside of the trunk (designated by the darker gray coloration) is a solid mixture of the material of the precursor gas and catalyst (e.g., nickel-silicide). In some embodiments of the invention, the gas may be flowed for a defined period of time. In other embodiments of the invention, the gas may be flowed until the catalyst is completely consumed.

FIG. 3 demonstrates the steps of forming the branches of the nanostructure. In this case, unlike in FIG. 2, only one trunk is shown. FIG. 3(a) illustrates one trunk 40 (as shown in FIG. 2(c)) on the substrate 10. In FIG. 3(b), a catalyst 50 has been deposited on the trunk 40; in this illustration, the catalyst is deposited as a thin film layer. FIG. 3(c) shows liquefied catalyst islands 60. As above, this liquefaction may be done by, for instance, heating. FIG. 3(d) illustrates the growth of the branches 70 of the nanostructures after the addition of a precursor gas. (As is mentioned supra, the gas may be introduced prior to the liquefaction of the catalyst.) FIG. 3(e) shows the branched nanostructures after the addition of the electroactive or electrically conductive coating 80, shown in black. The coating 80 is not necessarily as uniform as is indicated by FIG. 3(e). In some embodiments of the invention, the coating has a thickness of between about 5 nm and 1 μm. In some embodiments of the invention, the coating has a thickness of between about 5 nm and 500 nm. In some embodiments of the invention, the coating has a thickness of between about 50 nm and 250 nm. In some embodiments of the invention, the coating has a thickness of between about 100 nm and 200 nm.

In FIGS. 2 and 3, the shapes of the catalyst beads (30 in FIGS. 2 and 60 in FIG. 3) are merely meant to be illustrative and are not necessarily indicative of the actual shape, deposition pattern or thickness of the catalyst (liquefied or nanoparticles) at any specific point. The same is true in FIGS. 2 and 3 for the substrate 10 in that the rectangle is merely meant to represent that a substrate is in that position and is not necessarily indicative of the actual shape of the substrate. The same is also true of the nanostructures (40 and 70), in that the shapes, patterns and angles of the trunk and branches are not indicative of the actual shapes, patterns and angles of the trunk and branches, but are shown merely for purposes of exemplification.

Figure 4:
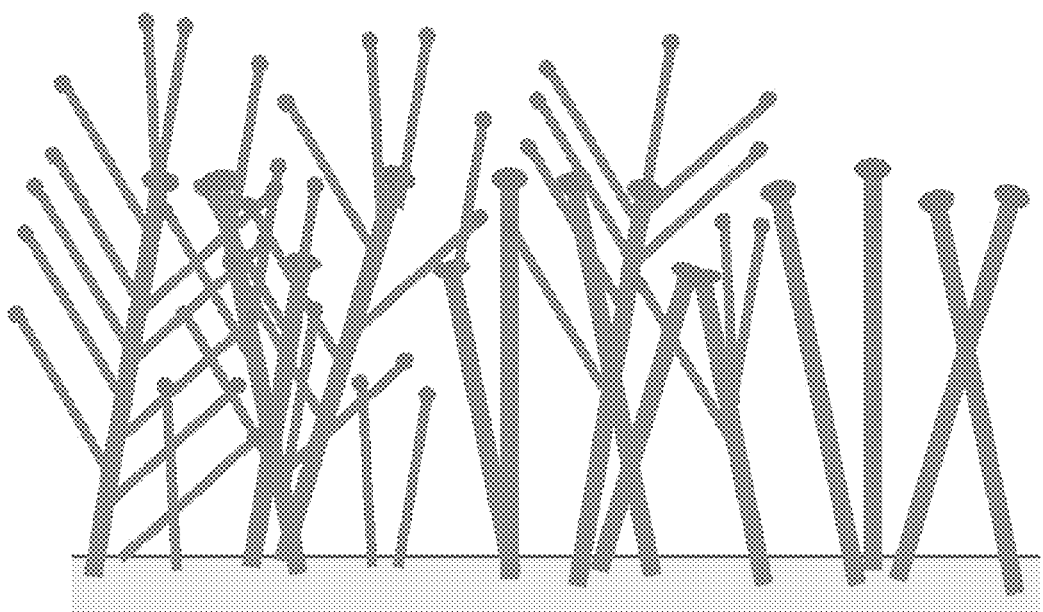
FIG. 4 is an illustration of branched nanostructures according to an embodiment of the invention.
Figure 5:
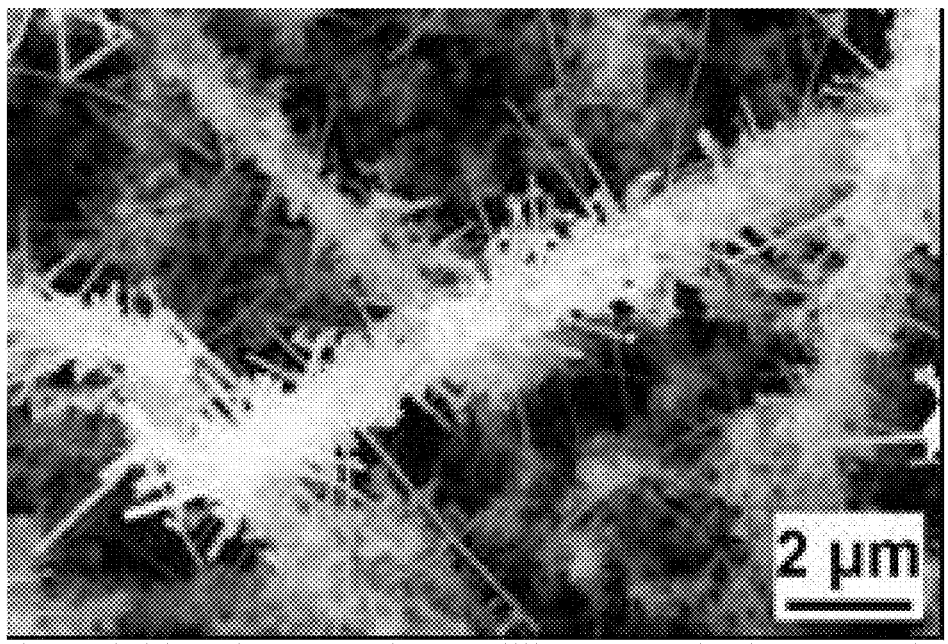
FIG. 5 is a SEM photograph of branched nanostructures according to an embodiment of the invention.
Figure 6:
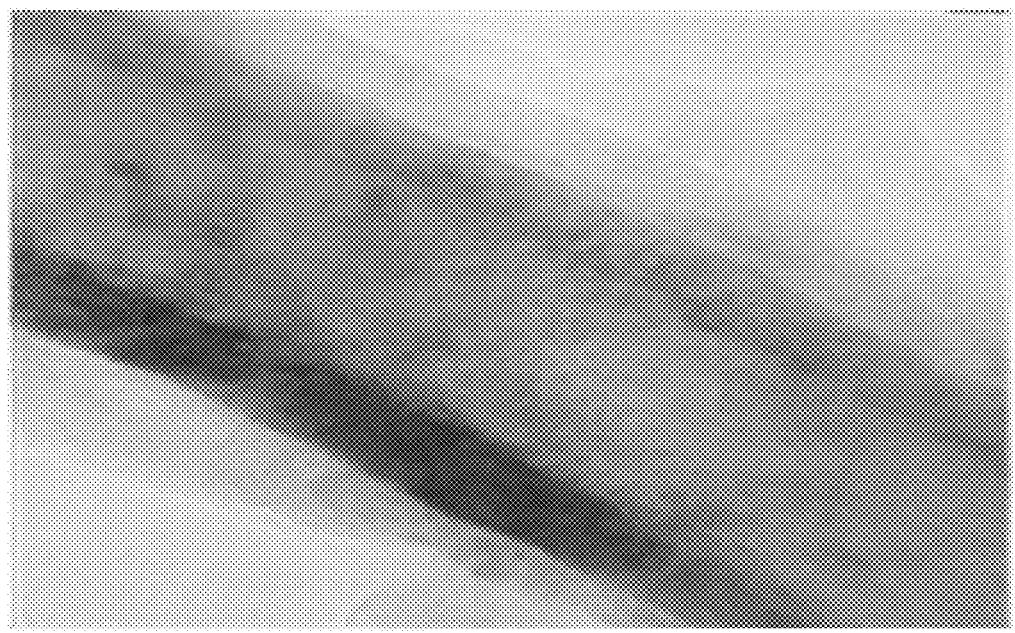
FIG. 6 is a TEM photograph that shows the outside core/shell morphology of a nanostructure according to an embodiment of the invention.

FIG. 4 is an illustration of branched nanostructures according to an embodiment of the invention. FIG. 5 is a SEM photograph of branched nanostructures according to an embodiment of the invention. As above, the nanostructures in these depictions are illustrative; the embodiments of the invention are not limited to the shapes, patterns or angles of these depictions. FIG. 6 is a TEM photograph that shows the outside core/shell morphology of a nanostructure according to an embodiment of the invention.

One embodiment of the invention is a lithium-ion battery electrode which contains a substrate; a plurality of branched nickel silicide nanostructures, formed according to one of the methods described above, grown on said substrate; and an electroactive or electrically conductive coating on at least a portion of the outside of the branched nickel silicide nanostructures. In some of these embodiments, the trunk and each branch of the branched nanostructure is a substantially cylindrical structure whose height exceeds its diameter. In some of the embodiments of the invention, the electroactive or electrically conductive coating is selected from silicon, germanium, nickel and carbon. In some embodiments, the electroactive or electrically conductive coating is amorphous silicon.

Another embodiment of the invention is a component for a lithium-ion battery. This component contains a substrate; a plurality of branched nickel silicide nanostructures, formed according to one of the methods described above, grown on said substrate; and an electroactive or electrically conductive coating on at least a portion of the outside of the branched nickel silicide nanostructures. In some of these embodiments, the trunk and each branch of the branched nanostructure is a substantially cylindrical structure whose height exceeds its diameter. In some of the embodiments of the invention, the electroactive or electrically conductive coating is selected from silicon, germanium, nickel and carbon. In some embodiments, the electroactive or electrically conductive coating is amorphous silicon.

Nanostructures of the invention can include any nanostructure that has mechanical flexibility greater than that of a film or layer, and that is able to be grown by an embodiment of the method of the current invention. Such nanostructures include, but are not limited to, branched nanowhiskers, nanorods, nanofibers and nanowires. The trunk and each branch of said branched nanostructure is a substantially cylindrical structure whose height exceeds its diameter. It is important to note that the nanostructures of the invention are not necessarily linear, but may be curved or may follow a more winding path. In general, each trunk and branch of the nanostructures of the invention have a diameter range of approximately 5 nm to 500 nm, and in some embodiments between 5 nm to 500 nm, and a length of about 100 nm to 50 μm, although the nanostructures are not limited to these values.

"Liquid" and "liquefied", as the terms relate to the catalyst of the invention, are meant to indicate a state of atomic mobility. That is, the atoms of the catalyst (for instance, nickel) are somewhat contained, as in a droplet and unlike a gas, but have the ability to move easily, unlike in a solid. This ability allows the atoms of the catalyst to remain in a relatively defined area to allow for nanostructure growth, yet still interact with the precursor gas and intercalate toward the outside of the growing nanostructure. This reactivity with the gas results in the catalyst being consumed during nanostructure formation.

A "precursor gas" refers to a gas that will result in the growth of nanostructures when it comes in contact with a catalyst. This gas may refer to a gas containing an electrically conductive or semiconductive element. An exemplary precursor gas is silane. The "material" of a precursor gas refers to the actual element in the gas that is able to react with the catalyst to form nanostructures. An exemplary material is silicon.

Amorphous silicon or carbon is described as an allotrope of silicon or carbon exhibiting substantially no long range order or crystal structure. Amorphous silicon or carbon does not have any true crystalline structure; "amorphous" literally means no shape, which is in contrast to, for instance, silicon atoms as they are grown in the core of the nanostructure.

An electrochemical cell refers to any system containing two electrodes (typically an anode and a cathode) and an electrolyte. These systems can either 1) facilitate a chemical reaction by the addition of electrical energy or 2) use chemical reactions to produce electrical energy. Non-limiting examples of such cells are fuel cells (including proton exchange membrane (PEM) fuel cells), batteries, hydrogen pumps, water electrolyzers and ultracapacitors. For purposes of this application, batteries, and specifically lithium-ion batteries, are preferred.

The electrode could be a fuel cell anode or cathode, or the anode or cathode electrode of any electrochemical cell such as water electrolyzers, electrochemical hydrogen pumps, or batteries. Anodes for lithium-ion batteries are exemplary uses for purposes of this application.

EXPERIMENTAL SECTION

Example 1

Anode substrate material for a lithium ion battery consisting of silicon nanowires grown through a vapor liquid solid (VLS) growth process, where the catalyst used was nickel.

The nickel catalyst layer is deposited onto a current collector foil (using stainless steel foil) in a physical vapor deposition (PVD) e-beam evaporator with a base pressure of $1\times10^{-6}$ and sample at room temperature. The deposited nickel layer is roughly 15 nm thick, with 99% purity.

The sample is placed into a horizontal hot walled chemical vapor deposition (CVD) furnace where the current collector substrate and catalyst layer is heated up to 500° C. under a flow of 200 sccm of argon and a base pressure of 100 Torr. The high temperature causes the catalyst layer to change into liquid phase and bead up into liquid balls. After the temperature has stabilized at 500° C. argon continues flowing at 200 sccm and a base pressure of 100 Torr for 10 more minutes. After 10 minutes the gas flow is switched from argon to a mixture of 99% argon and 1% silane which is flowed at 200 sccm with a base pressure of 100 Torr, which is flowed for 20 minutes during which the silicon is deposited into the nickel catalyst particle. The silicon is deposited into the nickel catalyst until it reaches its solubility limit, which at this point silicon grows underneath the nickel catalyst in a 3 dimensional structure that becomes a nanowire. After the 20 minutes of growth the heater is shut off allowing the substrate time to cool and the gas flow is switched back to argon gas with a flow rate of 200 sccm and a base pressure of 100 Torr.

During the nanowire growth the nickel particle is consumed in the silicon nanowires making the nanowire a nickel silicide nanowire. This occurs until the nickel is completely consumed or the flow of silane gas is interrupted in a timed experiment as we currently operate.

The grown nanowires samples are placed back into the PVD e-beam evaporator and a second catalyst layer of nickel is deposited, the surface tension at 15 nm thickness allows for the nickel to completely wet the silicon nanowire surface thus not having the shadowing effect that is commonly inherent in PVD depositions.

The nanowires are placed back into the horizontal hot walled CVD furnace and a second set of silicon nanowires is grown from the first set. The sample is double growth nickel silicide nanowires which provide a robust flexible substrate for an amorphous silicon film to be deposited upon for use in a lithium ion battery.

The nickel silicide nanowires of the invention provides a flexible substrate for silicon to be deposited onto that allows for the continued intercalation of lithium ions into the silicon film without the pulverization found in crystalline silicon films.

While various embodiments of the present invention have been illustrated and described, it will be appreciated by those skilled in the art that many further changes and modifications may be made thereunto without departing from the spirit and scope of the invention. For instance, the branched nanostructures of the invention may be used in any application for which high surface areas are desirable; the application is not exclusive to Li ion batteries, but could also be used for fuel cells, solar cells and drug delivery.

We claim:

1. A component for a lithium-ion battery, comprising:
   a. A current collecting foil; and
   b. A plurality of branched non-refractory transition metal silicide nanostructures, grown on said current collecting foil,
   wherein each nanostructure in said plurality of nanostructures comprises a solid primary structure (trunk) comprising metal silicide and solid secondary structures (branches) comprising metal silicide attached to said primary structure; and
   wherein each nanostructure comprises a core and a shell.

2. A component for a lithium-ion battery according to claim 1, wherein said non-refractory transition metal is nickel.

3. A component for a lithium-ion battery of claim 1 wherein the trunk and each branch of said branched nanostructure is a substantially cylindrical structure whose height exceeds its diameter.

4. A component for a lithium-ion battery according to claim 1, wherein said component for a lithium-ion battery further comprises an electroactive or electrically conductive coating on at least a portion of the outside of said branched non-refractory transition metal silicide nanostructures.

5. A component for a lithium-ion battery according to claim 4, wherein said electroactive or electrically conductive coating comprises silicon, germanium, nickel, carbon, or a transition metal oxide.

6. A component for a lithium-ion battery according to claim 1, wherein said nanostructures comprise additional branches, wherein the additional branches may be present on either the solid primary structures or the solid secondary structures.

7. A component for a lithium-ion battery according to claim 1, wherein said current collecting foil is a stainless steel foil.

8. A component for a lithium-ion battery according to claim 1, comprising:
   a. A stainless steel foil substrate; and b. A plurality of branched non-refractory transition nickel silicide nanostructures, grown on said substrate, wherein each nanostructure comprises a solid primary structure (trunk) comprising nickel silicide on said substrate and solid secondary structures (branches) comprising nickel silicide attached to said primary structure; and wherein each nanostructure comprises a core and a shell.

* * * * *